(12) United States Patent
Toguri et al.

(10) Patent No.: US 7,346,508 B2
(45) Date of Patent: Mar. 18, 2008

(54) INFORMATION RETRIEVING METHOD AND APPARATUS

(75) Inventors: Yasuhiro Toguri, Kanagawa (JP); Masayuki Nishiguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 1015 days.

(21) Appl. No.: 10/342,985

(22) Filed: Jan. 15, 2003

(65) Prior Publication Data

US 2003/0154082 A1  Aug. 14, 2003

(30) Foreign Application Priority Data

Jan. 25, 2002  (JP) .............................. 2002-017621

(51) Int. Cl.
*G10L 15/00* (2006.01)
*H04M 7/00* (2006.01)
(52) U.S. Cl. ...................... 704/246; 704/231; 704/251; 379/202.01
(58) Field of Classification Search ................ 704/246, 704/9, 231, 251; 379/202.01; 707/6
See application file for complete search history.

(56) References Cited

U.S. PATENT DOCUMENTS

| 5,121,428 | A | * | 6/1992 | Uchiyama et al. | .......... 704/243 |
| 5,625,747 | A | * | 4/1997 | Goldberg et al. | .......... 704/243 |
| 5,675,709 | A | * | 10/1997 | Chiba | .......... 704/278 |
| 5,893,057 | A | * | 4/1999 | Fujimoto et al. | .......... 704/246 |
| 6,405,166 | B1 | * | 6/2002 | Huang et al. | ............. 704/246 |
| 6,413,095 | B1 | * | 7/2002 | Tallal et al. | .............. 434/185 |
| 6,678,656 | B2 | * | 1/2004 | Macho et al. | ............... 704/233 |
| 6,714,909 | B1 | * | 3/2004 | Gibbon et al. | ............. 704/246 |
| 6,853,716 | B1 | * | 2/2005 | Shaffer et al. | ......... 379/202.01 |

* cited by examiner

*Primary Examiner*—Tālivaldis Ivars Šmits
*Assistant Examiner*—Lamont Spooner
(74) *Attorney, Agent, or Firm*—Robert J. Depke; Rockey, Depke & Lyons, LLC.

(57) ABSTRACT

A speaker of encoded speech data recorded in a semiconductor storage device in an IC recorder is to be retrieved easily. An information receiving unit 10 in a speaker retrieval apparatus 1 reads out the encoded speech data recorded in a semiconductor storage device 107 in an IC recorder 100. A speech decoding unit 12 decodes the encoded speech data. A speaker frequency detection unit 13 discriminates the speaker based on a feature of the speech waveform decoded to find the frequency of conversation (frequency of occurrence) of the speaker in a preset time interval. A speaker frequency graph displaying unit 14 displays the speaker frequency on a picture as a two-dimensional graph having time and the frequency as two axes. A speech reproducing unit 16 reads out the portion of the encoded speech data corresponding to a time position or a time range specified by a reproducing position input unit 15 based on this two-dimensional graph from the storage device 11 and decodes the read-out data to output the decoded data to a speech outputting unit 17.

13 Claims, 8 Drawing Sheets

INFORMATION RETRIEVING METHOD AND APPARATUS

BACKGROUND OF THE INVENTION

1. Field of the Invention

The present invention relates to an information retrieving method and an information retrieving apparatus. More particularly, it relates to an information retrieving method and an information retrieving apparatus in which a speaker of the speech information is recognized and discriminated to detect and retrieve the speaking position of a desired speaker. This application claims priority of Japanese Patent Application No. 2002-017621, filed on Jan. 25, 2002, the entirety of which is incorporated by reference herein.

2. Description of Related Art

Recently, it is frequently practiced to digitize speech signals, compress and encode the information of the digital speech signals for reducing the information volume of the digital speech signals and to store the so encoded information in a storage device or a recording medium for use later on. In particular, there has been developed a digital speech recorder, or a so-called IC recorder, in which the speech, such as conversation in a conference or an interview, is encoded by a speech encoding technique for recording on a semiconductor storage device (memory) or a storage medium exploiting a semiconductor memory (memory card).

The configuration of a routine IC recorder is shown in FIG. 6, in which an IC recorder 100 is made up by a microphone 101, an A/D (analog to digital) converter 102, a speech encoder 103, a speech decoder 104, a D/A (digital to analog) converter 105, a loudspeaker 106, a semiconductor storage device (memory) 107, an information transmission unit 108, and an output terminal 109. A semiconductor storage medium (memory card) may also be used in place of the semiconductor storage device 107.

The speech signals, input via microphone 101, are converted in the A/D converter 102 and compression-coded by the speech encoder 103 so as to be then stored in the semiconductor storage device 107. The compression-coded speech data, thus stored in the semiconductor storage device 107, are read out and reproduced by the speech decoder 104 and converted by the D/A converter 105 into analog signals so as to be output at the loudspeaker 106, or are read out by the information transmission unit 108 so as to be transmitted to outside equipment via output terminal 109.

Meanwhile, there has also been developed a system in which, in recording speech data in the IC recorder, simple additional information or attribute information of speech data, such as data name, date or simple comments, can be recorded along with the speech data.

In many cases, the IC recorder has a random access function of pre-registering a position in the speech data as the index information for reproduction promptly from the registered position at the time of reproduction. In the IC recorder, simple comments pertinent to the registered position can be appended as the tag information.

The speech encoding system used in the IC recorder is hereinafter explained. The speech encoding system may roughly be classified into a waveform encoding, an analysis-by-synthesis encoding and a hybrid encoding which is a combination of the waveform encoding and the analysis-by-synthesis encoding.

The waveform encoding encodes the speech waveform so that the waveform may be reproduced as faithfully as possible. The analysis-by-synthesis encoding expresses the signals by parameters, based on the speech generating model, for encoding.

There exist a variety of techniques and apparatus for waveform encoding. Examples of the techniques and apparatus include sub-band coding in which audio signals on the time axis are split into plural frequency bands and encoded without blocking, and transform encoding in which the signals on the time axis are blocked every unit time and transformed into spectral components which are encoded. There is also proposed a technique of high efficiency encoding consisting in the combination of the aforementioned sub-band encoding system and the transform encoding system. With this technique, the time domain signals are split into plural frequency bands by means of the sub-band coding, and the signals of the respective bands are orthogonal-transformed into signals on the frequency axis, and the frequency domain signals, resulting from the orthogonal transform, are encoded from one frequency band to another.

As analysis-by-synthesis encoding, researches in the analysis-by-synthesis system, employing linear predictive coding (LPC) are now proceeding. This encoding may be exemplified by harmonic encoding, a multi-pass drive linear predictive coding (MPC) employing the analysis-by-synthesis method (A-b-S), and code excited linear prediction (CELP) coding.

In general, in the encoding system, employing the LPC analysis, the spectral envelope information is extracted by linear prediction coding (LPC) analysis, and the LPC information is transformed into PARCOR coefficients (PARtial auto-CORrelation coefficient) or LSP (linear spectrum pair) coefficients for quantization and encoding. There is also researched a hybrid system consisting in the combination of the analysis-by-synthesis encoding by LPC analysis and the waveform encoding of the LPC residual signals. This system is routinely used for an IC recorder for recording the conferencing.

FIG. 7 shows a schematic structure of a routine speech encoding system employing the LPC analysis. In FIG. 7, an LPC analysis unit 201 performs LPC analysis on speech signals D200 input via an input device 200 to find LPC coefficients D201. The LPC analysis unit 201 sends the LPC coefficients D201 to an LSP conversion unit 202.

The LSP conversion unit 202 converts the LPC coefficients D201 into LSP parameters D202 to route the LSP parameters D202 to an LSP quantizer 203, which LSP quantizer 203 quantizes the LSP parameters D202. Since the LSP parameters undergo deterioration on quantization to a lesser extent than the LPC coefficients, the routine practice is to perform conversion to the LSP parameters followed by quantization. Meanwhile, the technique for quantizing the LSP parameters is usually vector quantization.

An LPC inverse filtering unit 204 inverse quantizes the quantized LPC parameters 203 and further inverse transforms the parameters into LPC coefficients D204 which are then used for filtering the input signal D200 to extract LPC residual signals D205 from the input signals D200. The LPC inverse filtering unit 204 routes the extracted LPC residual signals D205 to a pitch analysis unit 205 and a pitch inverse filtering unit 207.

The pitch analysis unit 205 applies pitch analysis to the so found LPC residual signals D205 and sends the pitch information D206, such as pitch lag or pitch gain, resulting from the analysis, to a pitch quantizer 206, which then quantizes the pitch information D206.

The pitch inverse filtering unit 207 filters LPC residual signals D205, using the pitch information D208, obtained on inverse quantizing the quantized pitch information D207, to extract pitch components from the LPC residual signals D205. The pitch inverse filtering unit 207 sends flattened residual signals D209 to an orthogonal transform unit 208.

The orthogonal transform unit 208 transforms the residual signals D209 int spectral coefficients D210. A spectral quantizing unit 209 quantizes the spectral coefficients D210. In quantizing the spectral coefficients D210, a technique by vector quantization or a technique which is the combination of the quantization based on psychoacoustic model and the Huffman coding is used.

The quantized LPC parameters D203, quantized pitch information D207, quantized spectral data D211 and other subsidiary information are sent to a bit synthesis unit 210 where an encoded bitstream D212 is generated in accordance with a prescribed data format and supplied and output at an output unit 211.

FIG. 8 shows an illustrative recording format for encoded speech data generated by a speech encoding device employing the LPC analysis such as is shown in FIG. 7. Referring to FIG. 8, the encoded speech data is made up by the subsidiary data, such as data identification numbers, data names or data attributes, and block data of the speech information. On the other hand, the block data is made up by for example, the header, block-based subsidiary information, pitch information, LSP information and the spectral information.

FIG. 9 shows the schematic structure of a speech decoding device which is a counterpart device of the speech encoding device shown in FIG. 7. In FIG. 9, a bit decomposing unit 221 decomposes encoded data D220, input from an input unit 220 every predetermined block, into several partial elements. For example, the bit decomposing unit 221 decomposes the encoded data D220 into the quantized LSP information D221, quantized pitch information D222 and the quantized residual spectral information D223, on the block basis. The bit decomposing unit 221 sends the quantized LSP information D221, quantized pitch information D222 and the quantized residual spectral information D223 to an LSP inverse quantizing unit 222, a pitch inverse quantizing unit 223 and a spectral inverse quantizing unit 224, respectively.

The LSP inverse quantizing unit 222 inverse quantizes the quantized LSP information D221 to generate LSP parameters, which LSP parameters are then transformed into LPC coefficients D224. The LSP inverse quantizing unit 222 sends the LPC coefficients D224 to an LPC synthesis unit 227.

The pitch inverse quantizing unit 223 inverse quantizes the quantized pitch information D222 to generate the pitch information D225, such as pitch period or pitch gain. The pitch inverse quantizing unit 223 sends the pitch information D225 to a pitch synthesis unit 226.

The spectral inverse quantizing unit 224 inverse quantizes the quantized residual spectral information D223 to generate a residual spectral data D226 which is supplied to an inverse orthogonal transform unit 225.

The inverse orthogonal transform unit 225 applies inverse orthogonal transform to the residual spectral data D226 for conversion to a residual waveform D227. The inverse orthogonal transform unit 225 sends the residual waveform D227 to the pitch synthesis unit 226.

The pitch synthesis unit 226 filters the residual waveform D227, using the pitch information D225, supplied from the pitch inverse quantizing unit 223, to synthesize an LPC residual waveform D228. The pitch synthesis unit 226 sends this LPC residual waveform D228 to the LPC synthesis unit 227.

The LPC synthesis unit 227 filters the LPC residual waveform D228, using the LPC coefficients D224 supplied from the LSP inverse quantizing unit 222, to synthesize a speech waveform D229. The LPC synthesis unit 227 sends this speech waveform D229 to an output unit 228.

The technique for discriminating a speaker of a speech waveform, which is explained hereinafter, now is also researched briskly.

As a routine speech recognition technique, the following technique, for example, is used. First, characteristic values representative of a personality of speech signals by a speaker are extracted and pre-recorded as learning data. An input speech of a speaker is analyzed and characteristic values indicative of his or her personality are extracted and evaluated as to similarity with the learning data to discriminate and collate the speaker. As the characteristic values representative of a personality of speech, the cepstrum, for example, is used. Alternatively, LPC analysis is applied to speech signals to find LPC coefficients which are then transformed to produce LPC cepstrum coefficients usable as the characteristic values. The coefficients obtained on expansion to a time-domain polynominal of the cepstrum or LPC cepstrum coefficients, termed delta cepstrum, are used preferentially as characteristic values indicative of temporal changes of the speech spectrum. Additionally, the pitch or the delta pitch (coefficients obtained on expansion of a pitch polynominal) may also be used.

The learning data is prepared using the characteristic values, such as LPC (linear predictive coding) cepstrum, thus extracted, as standard patterns. As a method therefor, a method by vector quantization distortion or a method by HMM (Hidden Markov model) is preferentially used.

In the method by vector quantization distortion, the speaker-based characteristic values are grouped and the center of gravity values are stored as elements (code vectors) of a codebook. The characteristic values of the input speech are vector-quantized with the codebook of each speaker to find the average quantization distortion of each codebook with respect to the entire input speech. The speaker of the codebook with the smallest average quantization distortion is selected.

With the method by HMM, the speaker-based characteristic values, found as described above, are represented by the transition probability among the HMM states, and the probability of occurrence of the characteristic values in each state, and are determined for the entire input speech domain based on the average likelihood with a model.

Meanwhile, if, in the conventional IC recorder, employing the semiconductor storage device, the speaker's conversation in the recorded speech data is to be accessed and reproduced, the IC recorder has to own the function of registering the index information, while the index information has to be registered in advance in the IC recorder. For registering the index information, it is required for the human being to make audio-visual check of the entire domain of the speech data to search into the data portion of the speaker's conversation, by an extremely labor-consuming operation.

Moreover, even if the index information is registered, it is not that easy to comprehend in which data portion and with which frequency the desired speaker is speaking.

With an IC recorder not having the function of registering the index information or the tag information, the data portion including the speaker's conversation cannot be detected or retrieved, while it is not possible to reproduce the data from the conversation of the desired speaker or to partially reproduce only the conversation domain of the desired speaker.

SUMMARY OF THE INVENTION

In view of the above-depicted status of the art, it is an object of the present invention to provide a method and apparatus for information retrieval in which the conversation frequency information of a speaker of the speech data recorded on an IC recorder may be expressed and reproduced without registering the index information.

In one aspect, the present invention provides an information retrieving method for retrieving the information on a speaker in encoded speech data, from the encoded speech data, in which the method includes a speaker frequency detecting step of discriminating the speaker, for each recognition interval, based on a feature of the encoded speech data, and detecting the frequency of occurrence of the speaker for each frequency interval, and a speaker frequency graph outputting step of outputting and displaying the frequency of occurrence of each speaker, detected for each of the frequency intervals, as two-dimensional graphical data having time and the frequency of occurrence as two axes, on an output picture.

In the speaker frequency graph outputting step, the frequency of occurrence of the plural speakers may be output and displayed on the output picture.

The encoded speech data has been recorded on a random accessible recording device or recording medium, such as a semiconductor storage device, in an IC recorder. The method further includes a position specifying step of specifying a time position on the two-dimensional graphical data displayed on the output picture, and a speech reproducing step of reading-in the time position specified and reproducing the encoded speech data from the time position.

The information retrieving method further includes a speaker specifying step of specifying a desired speaker, wherein, in the speech reproducing step, the portion of the encoded speech data in which the frequency of occurrence of the desired speaker specified in the speaker specifying step is not less than a preset threshold value is reproduced.

In this information retrieval method, the frequency of occurrence (conversation frequency) of a speaker in the encoded speech data recorded on a semiconductor storage device in e.g., the IC recorder is displayed as two-dimensional graphical data having time and the frequency of occurrence as two axes. Moreover, based on the two-dimensional graphical data, the conversation position of the desired speaker is specified and reproduced.

In another aspect, the present invention provides an information retrieval apparatus for retrieving the information on a speaker in encoded speech data, from the encoded speech data, in which the apparatus includes speaker frequency detecting means for discriminating a speaker, for each preset recognition interval, based on a feature of the encoded speech data, and for detecting the frequency of occurrence of the speaker for each preset frequency interval, and speaker frequency graph outputting means for outputting and displaying the frequency of occurrence of each speaker, detected for each frequency interval, on an output picture, as two-dimensional graphical data having time and the frequency of occurrence as two axes.

The speaker frequency graph outputting means outputs and displays the frequency of occurrence of a plurality of speakers on the output picture.

The encoded speech data has been recorded on a random accessible recording device or recording medium, such as a semiconductor storage device, in an IC recorder. The apparatus further includes position specifying means for specifying a time position on the two-dimensional graphical data output to the output picture, and speech reproducing means for reading-in the time position specified and for reproducing the encoded speech data from the time position.

The information retrieval apparatus includes speaker specifying means for specifying a desired speaker. The speech reproducing means reproduces the portion of the encoded speech data in which the frequency of occurrence of the desired speaker specified by the speaker specifying means is not less than a preset threshold value.

In the present information retrieval apparatus, the frequency of occurrence (conversation frequency) of a speaker in the encoded speech data recorded in a semiconductor storage device in for example an IC recorder is displayed as two-dimensional graphical data having time and the frequency of occurrence as two axes. Moreover, based on the two-dimensional graphical data, the conversation position of a desired speaker may be specified and reproduced.

In the above-described information retrieval method for retrieving the speaker information in the encoded speech data, from the encoded speech data, according to the present invention, a speaker is discriminated every preset recognition interval, based on the feature of the encoded speech data, and the occurrence frequency of the speaker is detected every preset recognition interval, by way of performing a speaker frequency detecting step. The occurrence frequency of each speaker, detected every recognition interval, is output and displayed on an output picture as two-dimensional graphical data having the time and the occurrence frequency as two axes, by way of performing a speaker frequency graph outputting step.

It should be noted that, in the speaker frequency graphic outputting step, the occurrence frequency of plural speakers can be output and displayed on the output picture.

The encoded speech data is recorded in a random accessible storage device, such as a semiconductor storage device, within for example an IC recorder. In the information retrieval method, the time position or the time range is specified on the above-mentioned two-dimensional graphical data, displayed on the output picture, by way of performing a position specifying step. The time position or the time range specified is read in and the encoded speech data is reproduced from the time position or the encoded speech data of the time range is reproduced by way of performing a speech reproducing step.

The information retrieval method may also include a speaker specifying step for specifying a desired speaker, in which the portion of the encoded speech data in which the occurrence frequency of the desired speaker of the encoded speech data as specified in the speaker specifying step exceeds a preset threshold value is reproduced.

In this information retrieval method, in which the occurrence frequency (conversation frequency) of a given speaker in the encoded speech data recorded in the semiconductor storage device in the IC recorder is displayed as two-dimensional graphical data having the time and the occurrence frequency as two axes, the frequency of occurrence of the desired speaker can be conformed visually so that the conversation position of a desired speaker can be retrieved extremely readily.

Moreover, since the encoded speech data in the random accessible IC recorder is used, it is possible to visually specify the conversation position of a desired speaker, based on the two-dimensional graphical data, and to reproduce the corresponding portion of the data at once to confirm its contents.

The information retrieving apparatus according to the present invention is an information retrieving apparatus for retrieving the speaker information in the encoded speech data from the encoded speech data. In the information retrieving apparatus of the present invention, a given speaker is discriminated every preset recognition interval, based on a feature of the encoded speech data, and the occurrence frequency of the speaker is detected, every preset recognition interval, by speaker frequency detection means. The occurrence frequency of each speaker, detected from one frequency interval to another, is output and displayed on an output picture as two-dimensional graphical data having the time and the occurrence frequency as two axes, by speaker frequency graphic outputting means.

The speaker frequency graphic outputting means is able to output and display the occurrence frequency of plural speakers on the output picture.

The encoded speech data is recorded in a random accessible recording device, such as a semiconductor storage device, in the IC recorder, or on a recording medium, as an example. In the information retrieval apparatus, the time position or the time range on the two-dimensional graphical data displayed on the output picture is specified by position specifying means. The time position or the time range specified is read in and the encoded speech data is reproduced from the time position or the encoded speech data of the time range is reproduced by speech reproducing means.

In the information retrieving device, there may be provided speaker specifying means for specifying a desired speaker. The speech reproducing means may be adapted to reproduce the portion of the encoded speech data in which the occurrence frequency of the desired speaker as specified by the speaker specifying means exceeds a preset threshold value.

With the present information retrieving device, in which the occurrence frequency (conversation frequency) of the speaker in the encoded speech data recorded in the semiconductor storage device in the IC recorder, as an example, is displayed as two-dimensional graphical data having time and the occurrence frequency as both axes, the occurrence frequency of the desired speaker can be visually confirmed to retrieve the conversation position of the speaker extremely readily.

Additionally, since the encoded speech data in the randomly accessible IC recorder is used, it is possible to visually specify the conversation position of a desired speaker, based on the two-dimensional graphical data, and to reproduce the corresponding portion of the data at once to confirm its contents.

DESCRIPTION OF THE PREFERRED EMBODIMENTS

Figure 1:
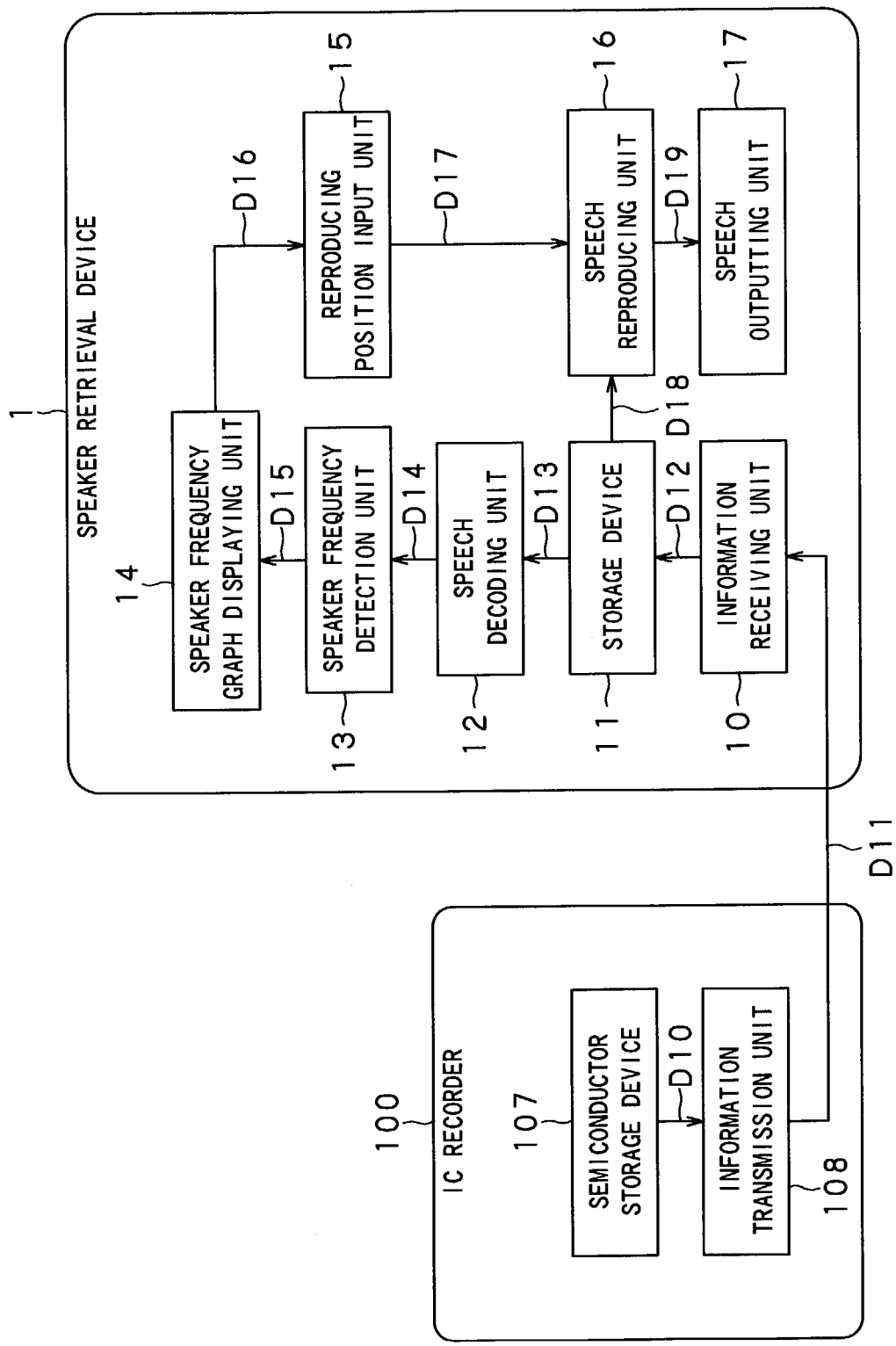
FIG. 1 illustrates the schematic structure of a speaker retrieval apparatus in an embodiment of the present invention.

Referring to the drawings, a certain preferred embodiment of the present invention will be explained in detail. In the present embodiment, the present invention is applied to a speaker retrieval apparatus in which the information on the conversation frequency of a speaker of encoded speech data, recorded in an IC recorder without registering the index information, is expressed and in which the conversation interval of the desired speaker may thereby be retrieved at once for reproduction.

More specifically, the speaker retrieval apparatus reads out encoded speech data, recorded in a semiconductor storage device of the IC recorder, and discriminates the speaker based on the feature of the speech to find the frequency of the conversation by the speaker (frequency of occurrence) in a predetermined time interval to demonstrate the speaker frequency in the form of a two-dimensional graph on a picture frame. By employing the speaker frequency information in the graphic form, it is possible to retrieve the conversation position of a desired speaker extremely readily to reproduce the conversation position or the conversation interval immediately.

In the following, it is assumed that the encoded data has been recorded in the semiconductor storage device of the IC recorder. However, the recorder device may be other than the semiconductor storage device, such that the encoded speech data may also be recorded on a random-accessible storage device or medium.

Figure 6:
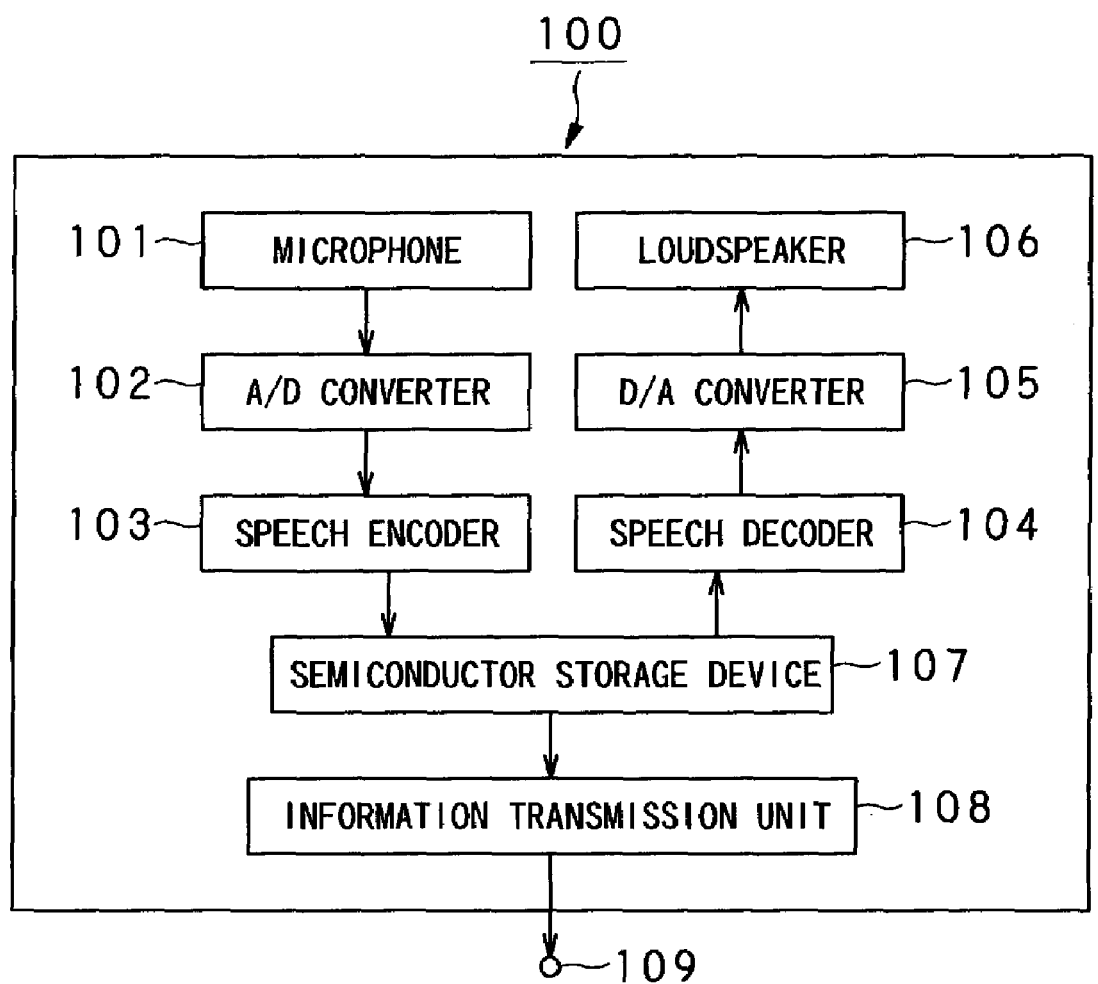
FIG. 6 illustrates a schematic structure of a conventional IC recorder.
Figure 7:
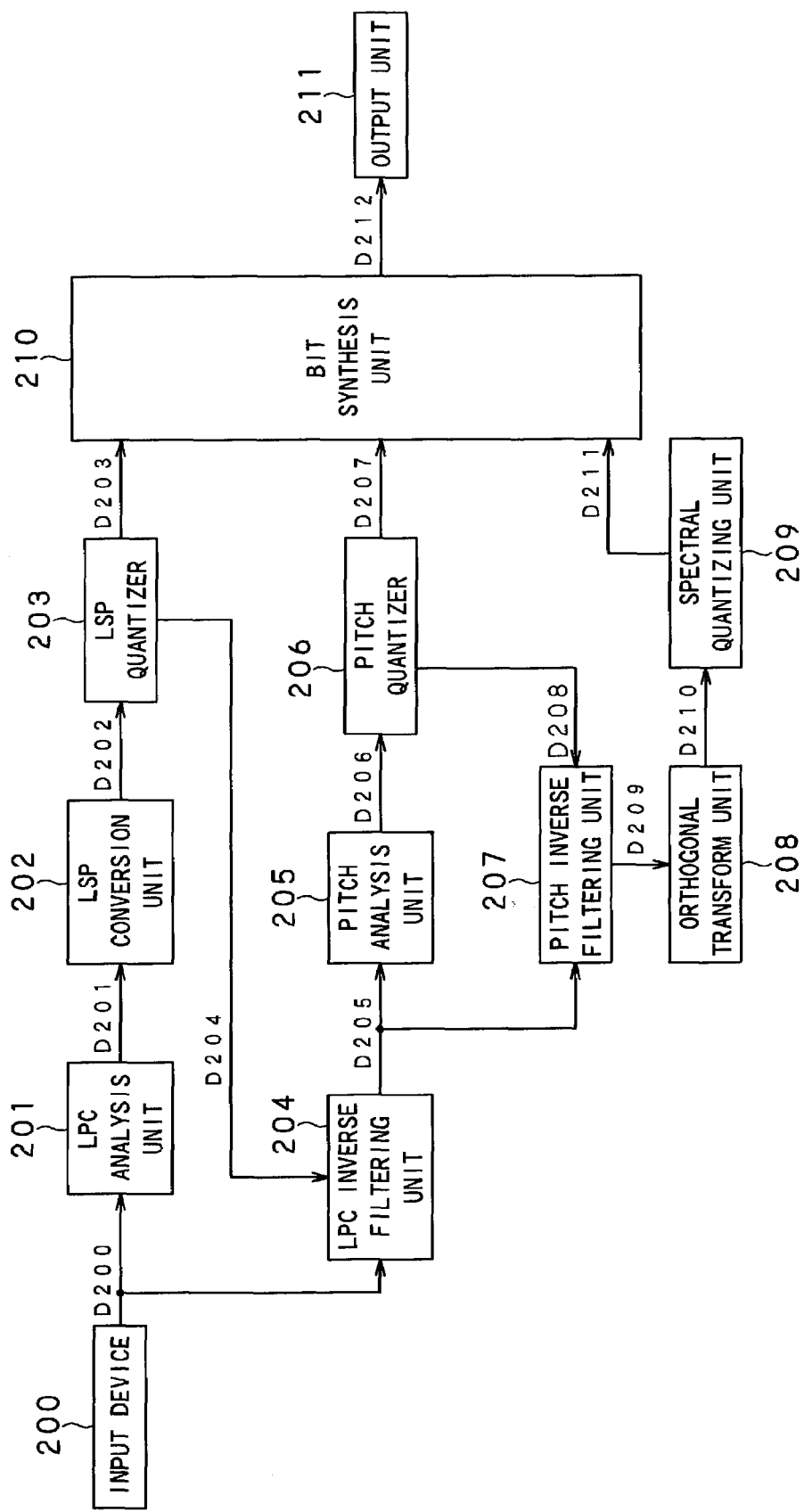
FIG. 7 illustrates a schematic structure of a conventional speech encoding unit.

The schematic structure of this speaker retrieval apparatus is shown in FIG. 1, in which the IC recorder is additionally shown. Since this IC recorder is similar in structure to the IC recorder 100, already explained with reference to FIG. 6, only the semiconductor storage device 107 and the information transmission unit 108 are shown with the same reference numerals as those in FIG. 6, while other parts or components are not shown for simplicity.

Referring to FIG. 1, the information transmission unit 108 of the IC recorder 100 reads out encoded speech data D10 from the semiconductor storage device 107 to send encoded speech data D11 over a transmission medium, such as transmission cable, to a speaker retrieval apparatus 1 of the instant embodiment.

The speaker retrieval apparatus 1 of the instant embodiment includes an information receiving unit 10, for receiving the information transmitted from the IC recorder 100, a storage unit 11 for transiently storing the transmitted information, a speech decoding unit 12 for decoding the encoded speech data into speech waveform data, a speaker frequency detection unit 13 for discriminating the speaker from the speech waveform data for detecting the speaker's conversation frequency (occurrence frequency) from one preset interval to another, and a speaker frequency graph displaying unit 14 for displaying the detected speaker frequency with respect to time by way of a two-dimensional graphic representation. The speaker retrieval apparatus 1 also includes a reproducing position input unit 15 for reading out a time point position and a time point range of speech data specified by a pointer on a graph of a picture frame, a speech reproducing unit 16 for performing the processing of partially reproducing the so specified time point position and the time point range of the speech data, and a speech outputting unit 17 for outputting the reproduced speech.

The information receiving unit 10 receives the encoded speech data D11 from the information transmission unit 108 of the IC recorder 100 to store encoded speech data D12 transiently in a storage device 11. It is noted that, in receiving the encoded speech data D11, the encoded speech data D11 may be received at a time, or received sequentially from one preset block to another. Meanwhile, the storage device 11 is a transient storage device for processing and may be a magnetic recording device or a semiconductor storage device (memory).

Figure 9:
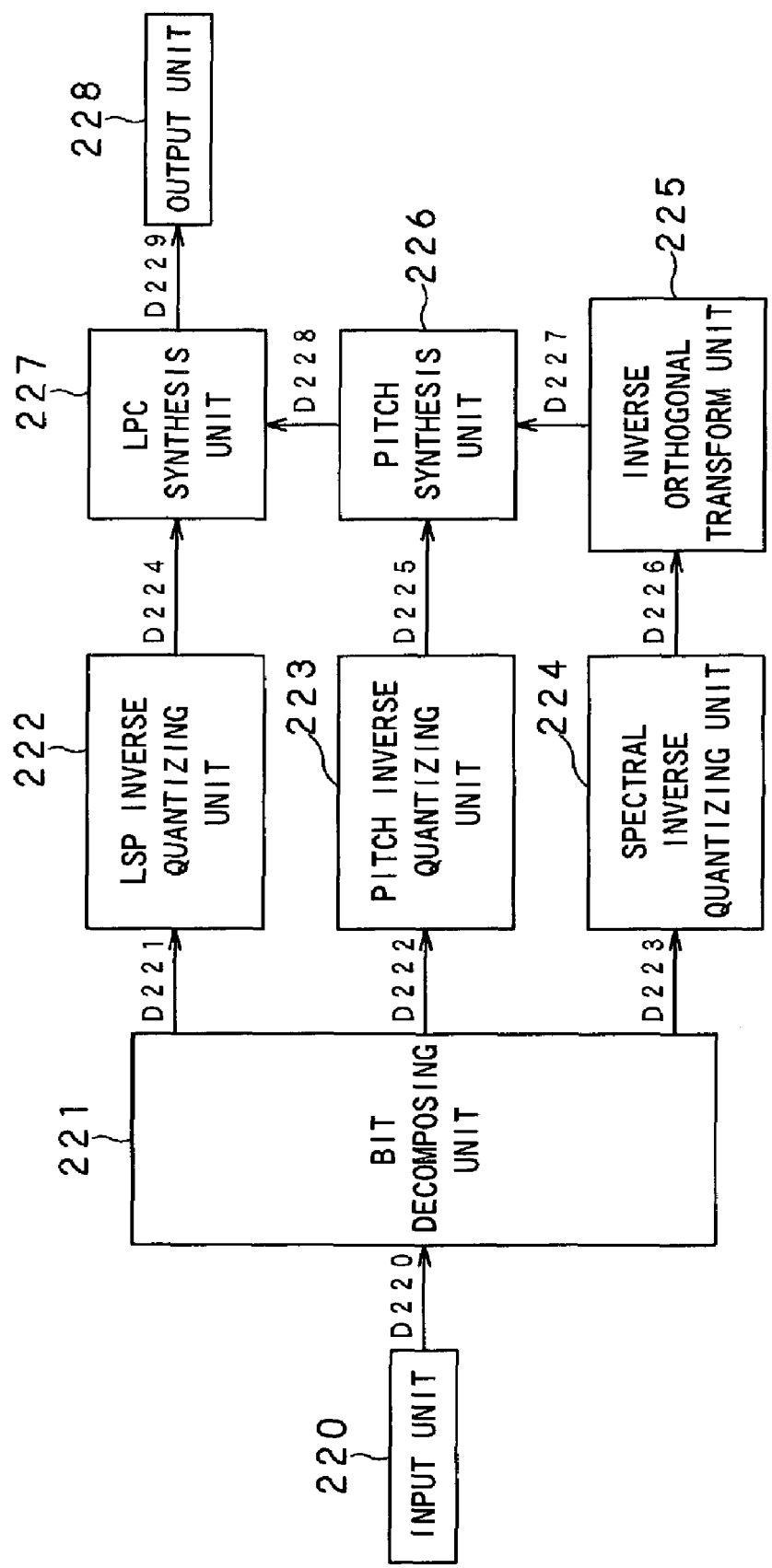
FIG. 9 illustrates the schematic structure of a conventional speech decoding device.

The speech decoding unit 12 reads-in the encoded speech data D13 from the storage device 11, from one preset block to another, to decode the data into a speech waveform. Meanwhile, the speech decoding unit 12 may be configured as the aforementioned speech decoding device, already explained with reference to FIG. 9.

The speaker frequency detection unit 13 reads-in decoded speech waveform D14 and discriminates the speaker from one recognition block to another, based on the feature of the speech, while detecting the speaker's occurrence frequency from one preset interval to another.

The inner structure of the speaker frequency detection unit 13 is now explained with reference to FIGS. 2 and 3. This speaker frequency detection unit 13 may be configured similarly to the information extraction device in the specification and drawings of the Japanese Patent Application No. 2001-177569 previously proposed by the present Assignee.

Figure 2:
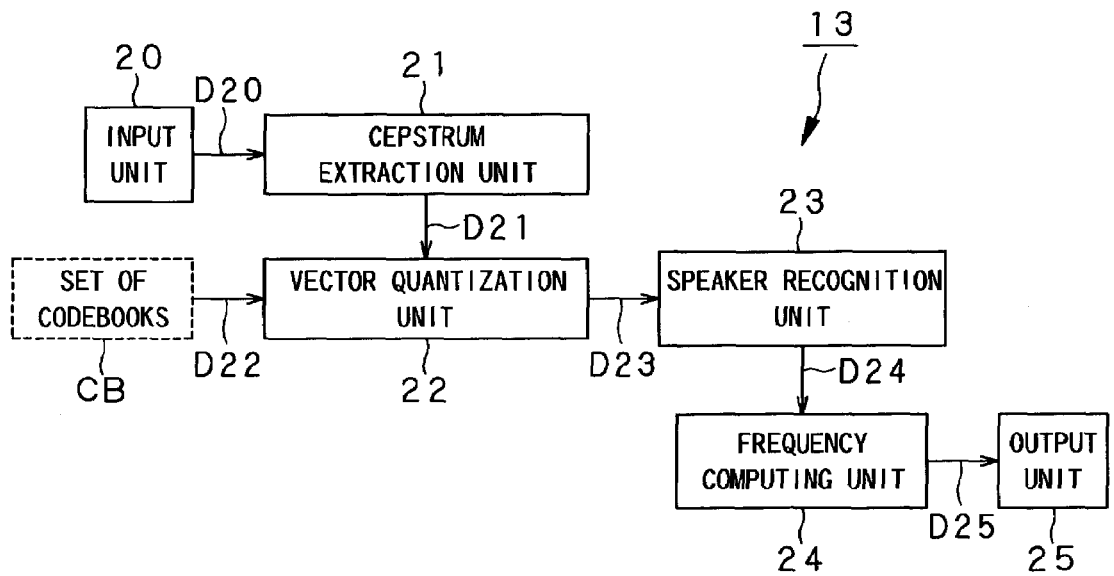
FIG. 2 illustrates the structure of a speaker frequency detection unit in the speaker retrieval apparatus.

Referring to FIG. 2, the speaker frequency detection unit 13 includes an input unit 20, a cepstrum extraction unit 21, a vector quantization unit 22, a speaker recognition unit 23, a frequency computing unit 24 and an output unit 25.

In FIG. 2, a set of codebooks CB has stored therein codebook data of registered speakers, used in vector quantization, in their entirety.

Figure 3:
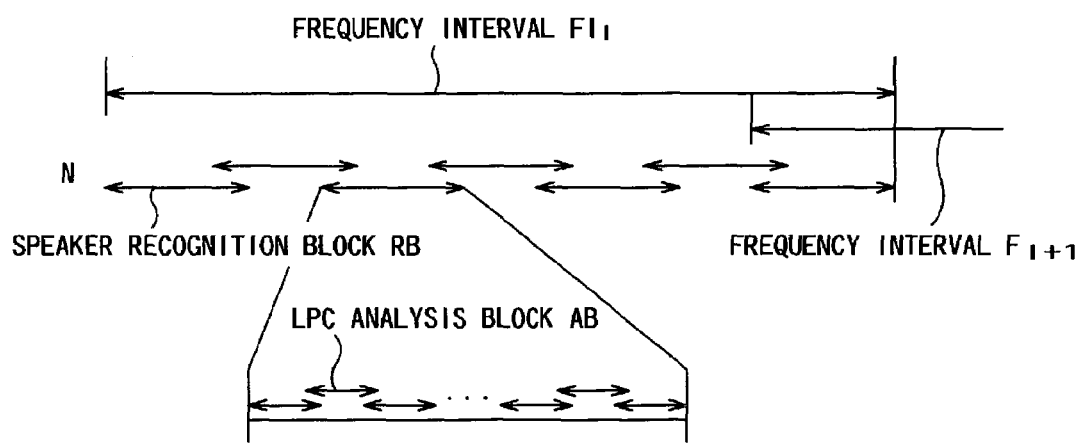
FIG. 3 illustrates the relationship between an LPC analysis block, a speaker recognition block and a frequency interval as used in the processing in the speaker frequency detection unit.

The input unit 20 reads-in the speech waveform data, decoded in the speech decoding unit 12, from one LPC analysis block AB, shown in FIG. 3, to another. The cepstrum extraction unit 21 applies LPC (linear predictive coding) analysis to block data D20 of the speech waveform to find LPC cepstrum coefficients D21. It is noted that the LPC analysis blocks AN are often slightly overlapped with neighboring blocks for improving the analysis performance.

The vector quantization unit 22 applies vector quantization to LPC cepstrum coefficients D21, obtained in the cepstrum extraction unit 21, using codebook data of the entire registered speakers D22, from the set of codebooks CB, to send vector quantization distortion D23 to the speaker recognition unit 23.

The speaker recognition unit 23 evaluates the vector quantization distortion D23, supplied from the vector quantization unit 22, and discriminates the speakers from one speaker recognition block RB, shown in FIG. 23, to another, to send discriminated speaker data D24 to the frequency computing unit 24. This speaker recognition block RB is a unit for speaker recognition having a block length preferably on the order of several sec. It is noted that this speaker recognition block RB may be slightly overlapped with neighboring blocks.

The frequency computing unit 24 memorizes the speaker data D24, supplied from the speaker recognition unit 23, and finds occurrence frequency data D25 for each speaker, from one frequency interval FI, shown in FIG. 3, to another, to route the occurrence frequency data D25 to the output unit 25. This frequency interval FI is a unit of finding the speaker occurrence frequency and N of the speaker recognition blocks are included in one frequency interval. It is noted that N is preferably ten to several hundreds.

Figure 4:
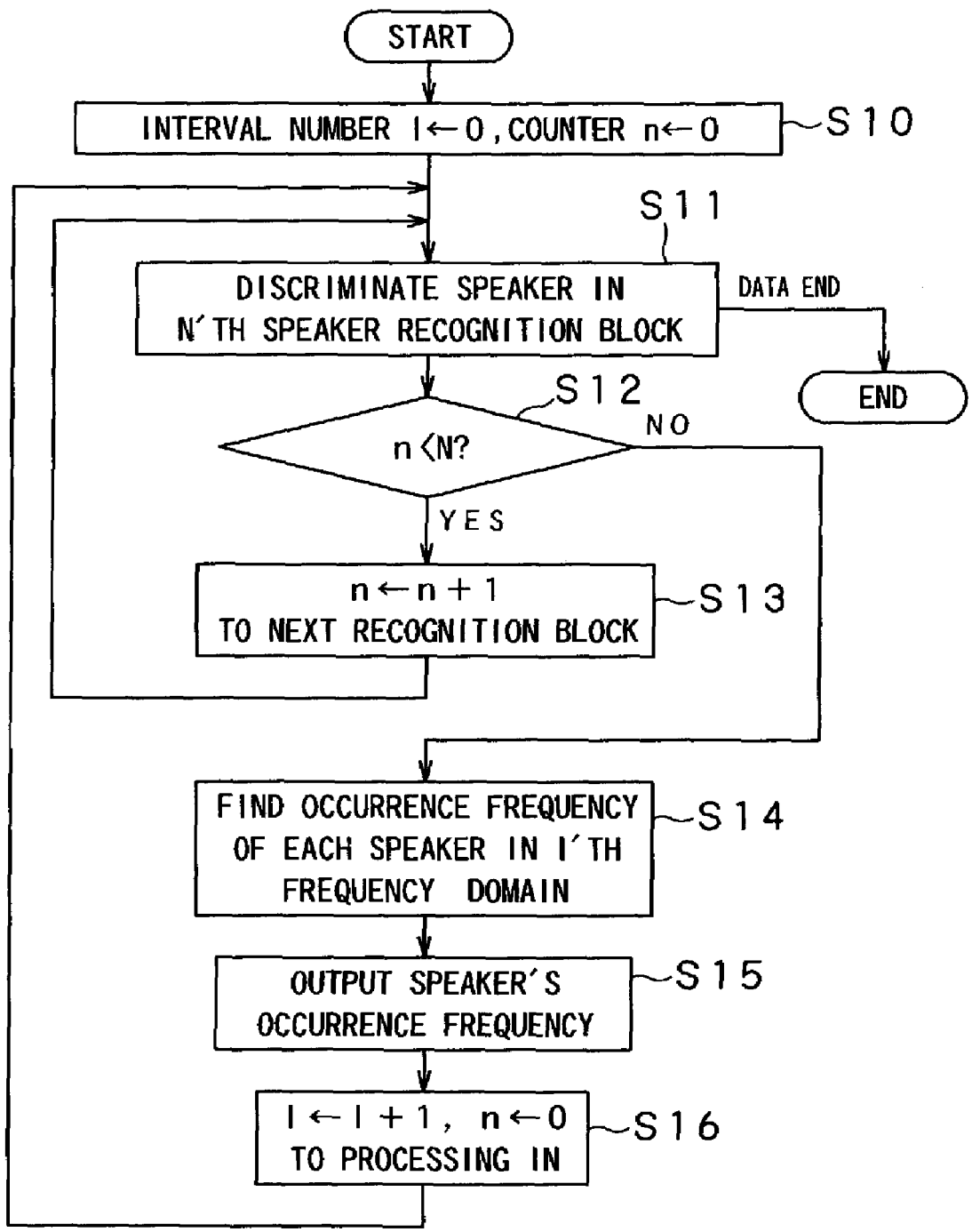
FIG. 4 is a flowchart for illustrating the operation of the speaker frequency detection unit.

Referring to the flowchart of FIG. 4, the operation of the speaker frequency detection unit 13 is explained in detail. First, in a step S10, an interval number I and the counter n are set to 1, by way of initialization. Meanwhile, the interval number I is the serial number affixed to the frequency intervals FI used in finding the speaker frequency and the counter n is used for counting the number of the already processed speaker recognition blocks RB in the I'th frequency interval FII.

Next, in a step S11, the speaker in the nth speaker recognition blocks RB is discriminated and the relevant speaker information is saved. In this case, when the processing has reached the trailing end of data, processing is terminated.

As for the speaker recognition technique, the technique described in for example the specification and the drawings of the aforementioned Japanese Patent Application No. 2001-177569 may be used. Specifically, the LPC cepstrum coefficients as found from one LPC analysis block AB to another are vector-quantized with the respective codebooks CB to save the respective vector quantization distortions. The vector quantization distortion is then found for each of the entire LPC analysis blocks AB of the speaker recognition block RB to compute the average quantization distortion to discriminate the speaker corresponding to the codebook with the smallest average quantization distortion as being the speaker in the speaker recognition block RB.

The collation decision of the discriminated speaker may be made at this time. If, as a result, the speaker is verified to be not the identified person, the speaker in the speaker recognition block RB is discriminated to be an unidentified speaker.

In a step S12, it is verified whether or not the counter n is less than N, that is whether or not there is any speaker recognition block RB in the frequency interval FII on which the speaker discrimination processing has not been performed.

If, in the step S12, the counter n is less than N (yes), that is if there is any speaker recognition block RB in the frequency interval FII on which the speaker discrimination processing has not been performed, the counter n is incremented in a step S13 by 1. Then, program reverts to the step S11 to continue the processing of the next speaker recognition block RB. The processing from the step S11 up to the step S13 is repeatedly performed in this manner until the speaker discrimination processing is performed on the entire speaker recognition blocks RB of the frequency interval FII.

If, in the step S12, the counter n is not less than N (no), that is if the speaker discrimination processing has been performed on all of the speaker recognition blocks RB of the frequency interval FII, processing transfers to a step S14.

In this step S14, the occurrence frequency of each speaker in the frequency interval FII is found. In a step S15, the frequency information of each speaker is output.

In this step S15, the interval number I is incremented by 1 and the counter n is initialized to 0 to revert to the step S11. The frequency information of each speaker is found for the totality of the frequency intervals FI in a similar manner until the trailing end of data is reached.

Figure 5:
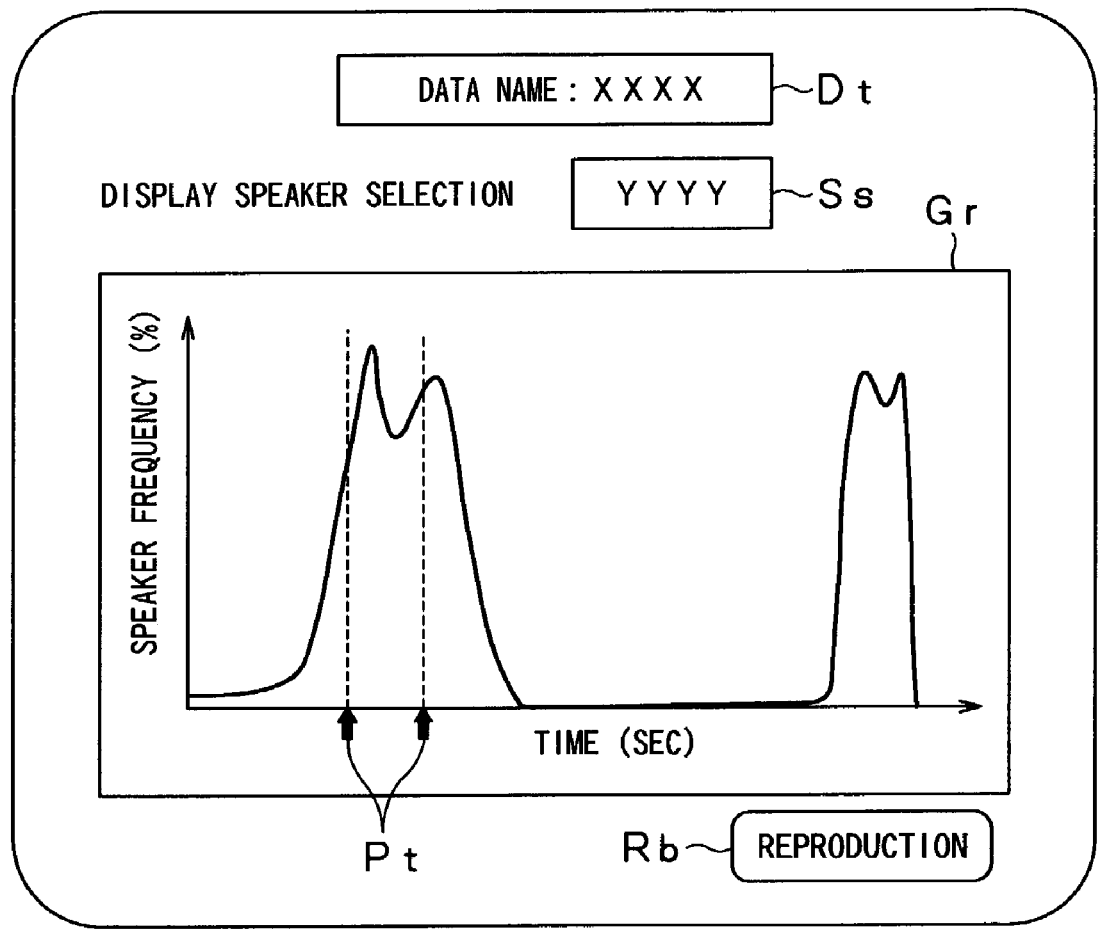
FIG. 5 illustrates an illustrative structure of a display picture in which the speaker frequency is demonstrated in a two-dimensional graph.

Reverting to FIG. 1, the speaker frequency graph displaying unit 14 reads-in speaker frequency data D15 in each frequency interval FI, found as described above, to display the read-in data on an output picture with respect to time in a two-dimensional graph. An illustrative structure of the output picture is shown in FIG. 5.

In this figure, a data name Dt being retrieved, an area Ss for selecting the speaker whose frequency information is displayed, an area Gr, for displaying the occurrence frequency of the selected speaker in a two-dimensional graph with respect to the time axis, a pointer Pt for specifying the time position or the time range desired to be reproduced, and a reproducing button Rb for partially reproducing the time position or the time range specified by the pointer Pt.

In the area Ss for selecting the speaker, the speaker's name or identification number may be input. Alternatively, selection may be from a list of the speakers. Not one but plural speakers may be specified. In this case, the graph of plural speakers specified is displayed in the area Gr.

In the pointer Pt, the start and end positions may be specified. Alternatively, only the start position may be specified with the sole pointer Pt without limiting the reproducing range.

The reproducing position input unit 15 of FIG. 1 reads out coordinate position data D16 of the pointer Pt, selected when the reproducing button Rb of FIG. 5 was pressed, for example, to find a reproducing time position or time range D17 in the speech data. The reproducing position input unit 15 sends this reproducing time position or time range D17 to the speech reproducing unit 16. It is possible for the reproducing position input unit 15 to read out only a portion of the data in which the occurrence frequency of the selected speaker is not less than a predetermined threshold value.

The speech reproducing unit 16 reads-in a portion of encoded speech data D18 corresponding to the specified time position or time range from the storage device 11 to decode the read-in data into a speech waveform to produce a decoded speech waveform signal D19 to the speech outputting unit 17.

As described above, the speaker retrieval apparatus 1 is able to visually recognize the frequency of occurrence of a desired speaker, for displaying the occurrence frequency (conversation frequency) of a speaker in the encoded speech data recorded in a semiconductor storage device in the IC recorder as two-dimensional graphical data having time and the occurrence frequency as two axes, and hence is able to retrieve the conversation position of the desired speaker extremely readily.

Moreover, since the encoded speech data in the random accessible IC recorder, it is possible to visually specify the conversation position of the desired speaker based on the two-dimensional graphical data and to reproduce the portion at once to verify its contents.

The present invention is not limited to the above-described embodiments and may be modified in many ways without departing from the scope of the invention.

For example, it is explained in the foregoing that the encoded speech data is once decoded into the speech waveform and subsequently the speaker identification processing is carried out. This, however, is not limitative of the present invention. That is, as in the information detection apparatus, disclosed in the specification and drawings of the Japanese patent application No. 2001-225051, proposed by the present Assignee, as an example, it is also possible to extract parameters from the encoded speech data to discriminate the speaker without decoding the encoded speech data into a time waveform.

Figure 8:
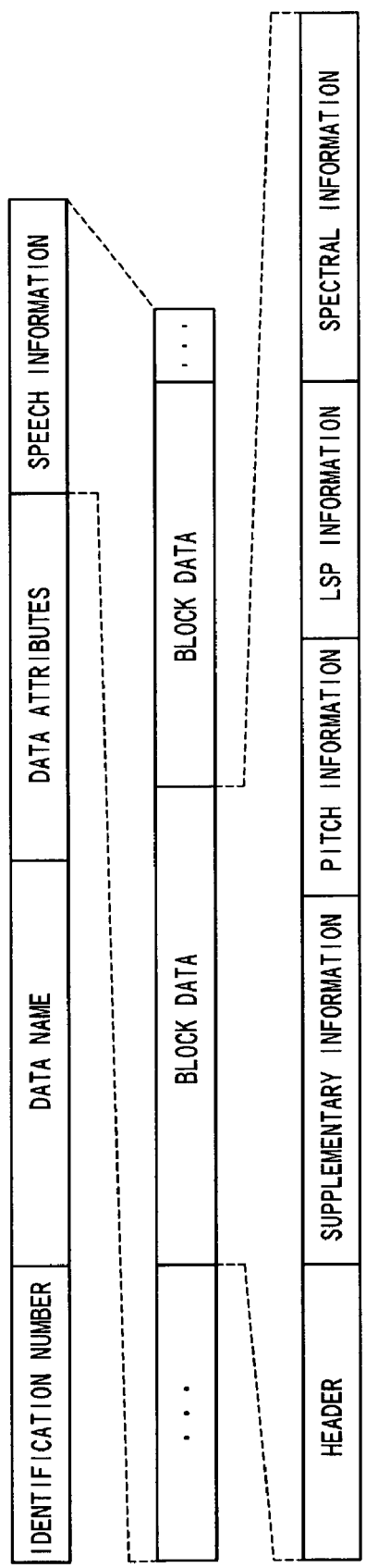
FIG. 8 illustrates a typical recording format of encoded speech data generated by the speech encoding device.

Specifically, a speaker can be discriminated by extracting only the LSP information from the encoded speech data of the recording format shown in FIG. 8, for example, decoding the extracted information, converting the decoded information into LPC cepstrum coefficients and by evaluating its vector quantization distortion.

By discriminating the speaker in this manner without decoding the encoded speech data into the time waveform, it is possible to reduce the processing volume and the storage area necessary for discrimination processing, while it is also possible to reduce the worsening of the recognition ratio ascribable to decoding and re-analysis.

While the invention has been described in accordance with certain preferred embodiments thereof illustrated in the accompanying drawings and descried in the above description in detail, it should be understood by those ordinarily skilled in the art that the invention is not limited to the embodiments, but various modifications, alternative constructions or equivalents can be implemented without departing from the scope and the spirit of the present invention as set forth and defined in the appended claims.

What is claimed is:

1. An information retrieving method for retrieving information on a speaker, from encoded speech data, said method comprising:
   a speaker frequency detecting step of determining the speaker for each recognition interval based on a feature of said encoded speech data; and
   a speaker frequency graph outputting step of outputting and displaying the frequency of occurrence of each speaker detected for each of said intervals as two-dimensional graphical data having time and the frequency of occurrence as two axes on an output image, wherein the image provides a numeric percentage representative of the speaker frequency for the interval.

2. The information retrieving method according to claim 1, wherein, in said speaker frequency graph outputting step, the frequency of occurrence of a plurality of speakers is output and displayed on said image.

3. The information retrieving method according to claim 1, wherein said encoded speech data has been recorded on a random accessible recording device or recording medium; said method further comprising:
   a position specifying step of specifying a time position on said two-dimensional graphical data displayed on said output image; and
   a speech reproducing step of reading-in said time position specified and reproducing said encoded speech data from said time position.

4. The information retrieving method according to claim 3, wherein, in said position specifying step, a time range on said two-dimensional graphical data is specified; and
   wherein, in said speech reproducing step, said encoded speech data of the time range specified is reproduced.

5. The information retrieving method according to claim 3, further comprising: a speaker specifying step of specifying a desired speaker, wherein, in said speech reproducing step, the portion of said encoded speech data in which the frequency of occurrence of said desired speaker specified in said speaker specifying step is not less than a preset threshold value is reproduced.

6. The information retrieving method according to claim 3, wherein said encoded speech data is recorded in a semiconductor storage device in an IC recorder.

7. An information retrieval apparatus for retrieving the information on a speaker in encoded speech data from said encoded speech data said apparatus comprising:
- speaker frequency detecting means for discriminating a speaker for each preset recognition interval based on a feature of said encoded speech data and for detecting the frequency of occurrence of the speaker for each interval;
- speaker frequency graph outputting means for outputting and displaying the frequency of occurrence of each speaker detected for each frequency interval on an output image as two-dimensional graphical data having time and the frequency of occurrence as two axes, and further wherein the image provides a numeric percentage representative of the speaker frequency for the interval.

8. The information retrieval apparatus according to claim 7, wherein said speaker frequency graph outputting means outputs and displays the frequency of occurrence of a plurality of speakers on said output image.

9. The information retrieval apparatus according to claim 7, wherein said encoded speech data has been recorded on a random accessible recording device or recording medium; said apparatus further comprising:
- position specifying means for specifying a time position on said two-dimensional graphical data output to said output image; and
- speech reproducing means for reading-in the time position specified and for reproducing said encoded speech data from said time position.

10. The information retrieval apparatus according to claim 9, wherein said position specifying means specifies a time range on said two-dimensional graphical data; and
- wherein said speech reproducing means reproduces said encoded speech data in the time range specified.

11. The information retrieval apparatus according to claim 9, further comprising:
- speaker specifying means for specifying a desired speaker;
- said speech reproducing means reproducing the portion of said encoded speech data in which the frequency of occurrence of said desired speaker specified by said speaker specifying means is not less than a preset threshold value.

12. The information retrieval apparatus according to claim 9 wherein said encoded speech data is recorded in a semiconductor storage device in an IC recorder.

13. An information retrieving method for retrieving information on a speaker, from encoded speech data, said method comprising:
- a speaker frequency detecting step of determining the speaker for each recognition interval based on a feature of said encoded speech data;
- wherein the speaker frequency detecting step for determining the speaker of the recording in each interval is comprised of extracting only LSP information from the encoded speech data, decoding the extracted information, converting the decoded information into LPC cepstrum coefficients and evaluating vector quantization distortion; and
- a speaker frequency graph outputting step of outputting and displaying the frequency of occurrence of each speaker detected for each said recognition interval as two-dimensional graphical data having time and frequency of occurrence as two axes on an output image, wherein the image provides a numeric percentage representative of the speaker frequency for the interval.

* * * * *